United States Patent
Murata

(10) Patent No.: US 10,620,615 B2
(45) Date of Patent: Apr. 14, 2020

(54) ENGINEERING TOOL COORDINATION DEVICE, ENGINEERING TOOL COORDINATION METHOD, AND NON-TRANSITORY COMPUTER READABLE STORAGE MEDIUM

(71) Applicant: Yokogawa Electric Corporation, Tokyo (JP)

(72) Inventor: Hideki Murata, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 239 days.

(21) Appl. No.: 15/790,496

(22) Filed: Oct. 23, 2017

(65) Prior Publication Data

US 2018/0120823 A1    May 3, 2018

(30) Foreign Application Priority Data

Oct. 27, 2016 (JP) ................................. 2016-210786

(51) Int. Cl.
| | |
|---|---|
| *G05B 23/02* | (2006.01) |
| *G05B 19/05* | (2006.01) |
| *G05B 19/042* | (2006.01) |
| *G05B 19/048* | (2006.01) |

(52) U.S. Cl.
CPC .......... *G05B 23/02* (2013.01); *G05B 19/048* (2013.01); *G05B 19/0426* (2013.01); *G05B 19/0428* (2013.01); *G05B 19/056* (2013.01); *G05B 2219/36231* (2013.01); *Y02P 90/02* (2015.11)

(58) Field of Classification Search
CPC ............ G05B 19/0426; G05B 19/0428; G05B 19/056; G05B 19/408; G05B 2219/36231; G05B 23/02; Y02P 90/02
USPC .................................................. 717/124–135
See application file for complete search history.

(56) References Cited

U.S. PATENT DOCUMENTS

| | | | |
|---|---|---|---|
| 6,205,407 B1 * | 3/2001 | Testa ............... | G01R 31/318307 702/119 |
| 6,448,982 B1 | 9/2002 | Klapper et al. | |
| 6,556,950 B1 * | 4/2003 | Schwenke ............ | G05B 17/02 700/83 |

(Continued)

FOREIGN PATENT DOCUMENTS

| | | |
|---|---|---|
| JP | 2012-160021 A | 8/2012 |
| JP | 2012-208933 A | 10/2012 |

*Primary Examiner* — Marina Lee
(74) *Attorney, Agent, or Firm* — Sughrue Mion, PLLC

(57) ABSTRACT

An engineering tool coordination device includes a first tool interface configured to acquire first data having a first data format usable to an engineering tool, a data converter configured to convert the first data into second data usable to the control program, the second data having a second data format, a program provider configured to provide the second data to the control program, a second tool interface configured to acquire a first test request having a first test request format from the engineering tool, a test converter configured to convert the first test request into a second test request executable in the control program, the second test request having a second test request format, and a test manager configured to cause to execute an operation test program in the control program and to operate an operation test using the second data on a basis of the second test request.

14 Claims, 5 Drawing Sheets

(56) References Cited

U.S. PATENT DOCUMENTS

| | | | | |
|---|---|---|---|---|
| 7,024,660 B2* | 4/2006 | Andrade | ............... | G06F 11/263 |
| | | | | 714/25 |
| 9,235,400 B2* | 1/2016 | Konradi | ................... | G06F 8/65 |
| 2004/0006401 A1* | 1/2004 | Yamada | ................ | G05B 15/02 |
| | | | | 700/83 |
| 2009/0217200 A1* | 8/2009 | Hammack | .......... | G05B 19/0426 |
| | | | | 715/810 |
| 2009/0259676 A1* | 10/2009 | Yamada | ................ | G05B 15/02 |
| 2013/0305031 A1* | 11/2013 | Nitta | ................... | G05B 19/042 |
| | | | | 713/100 |
| 2014/0082600 A1* | 3/2014 | Konradi | ................ | G05B 19/12 |
| | | | | 717/168 |
| 2018/0120823 A1* | 5/2018 | Murata | ............. | G05B 19/0428 |

* cited by examiner

ENGINEERING TOOL COORDINATION DEVICE, ENGINEERING TOOL COORDINATION METHOD, AND NON-TRANSITORY COMPUTER READABLE STORAGE MEDIUM

BACKGROUND

Technical Fields

The present invention relates to an engineering tool coordination device, an engineering tool coordination method, and a non-transitory computer readable storage medium.

Priority is claimed on Japanese Patent Application No. 2016-210786, filed Oct. 27, 2016, the contents of which are incorporated herein by reference.

Related Art

In the related art, industrial plants such as chemical plants, plants which manage and control well sites such as gas wells and oil wells and the vicinity thereof, plants which manage and control hydraulic power generation, thermal power generation, nuclear power generation, and the like, plants which manage and control environmental power generation such as solar power generation and wind power generation, and plants which manage and control water supply and sewage, dams, and the like, and factories (hereinafter collectively referred to a "plant") have been utilized, production control systems represented by a distributed control system (DCS) in which site units such as measuring units or operating units referred to as field units and a control device configured to control these are connected with communication means have been constructed and advanced automatic operations have been realized.

In a system and the like of a plant constructed to realize the above-described advanced automatic operation, an engineering tool configured to perform engineering such as creation, modification, and deletion of a control program, management of a change history, and operation tests, or the like executed by a control device configured to control an operation of a plant has been used (for example, refer to U.S. Pat. No. 6,448,982).

However, since a method of defining a logic and a data format used in a control program is different depending on a type or the like of a control device, an engineering tool according to the type of the control device needs to be individually prepared in some cases, and efficiency of engineering of the control program decreases in some cases.

SUMMARY

An engineering tool coordination device may include a first tool interface configured to acquire first data having a first data format usable to an engineering tool, the engineering tool being configured to engineer a control program executed in a control device configured to control an operation of a plant, a data converter configured to convert the first data acquired by the first tool interface into second data usable to the control program, the second data having a second data format different from the first data format, a program provider configured to provide the second data converted by the data converter to the control program, a second tool interface configured to acquire a first test request having a first test request format from the engineering tool, a test converter configured to convert the first test request acquired by the second tool interface into a second test request executable in the control program, the second test request having a second test request format different from the first test request format, and a test manager configured to cause to execute an operation test program in the control program and to operate an operation test using the second data on a basis of the second test request acquired by the test converter.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an engineering tool coordination device, an engineering tool coordination method, and a non-transitory computer readable storage medium which improve efficiency of engineering of a control program using an engineering tool.

An engineering tool coordination device, an engineering tool coordination method, an engineering tool coordination program, and a non-transitory computer readable storage medium according to an embodiment of the present invention will be described in detail below with reference to the drawings.

Figure 1:
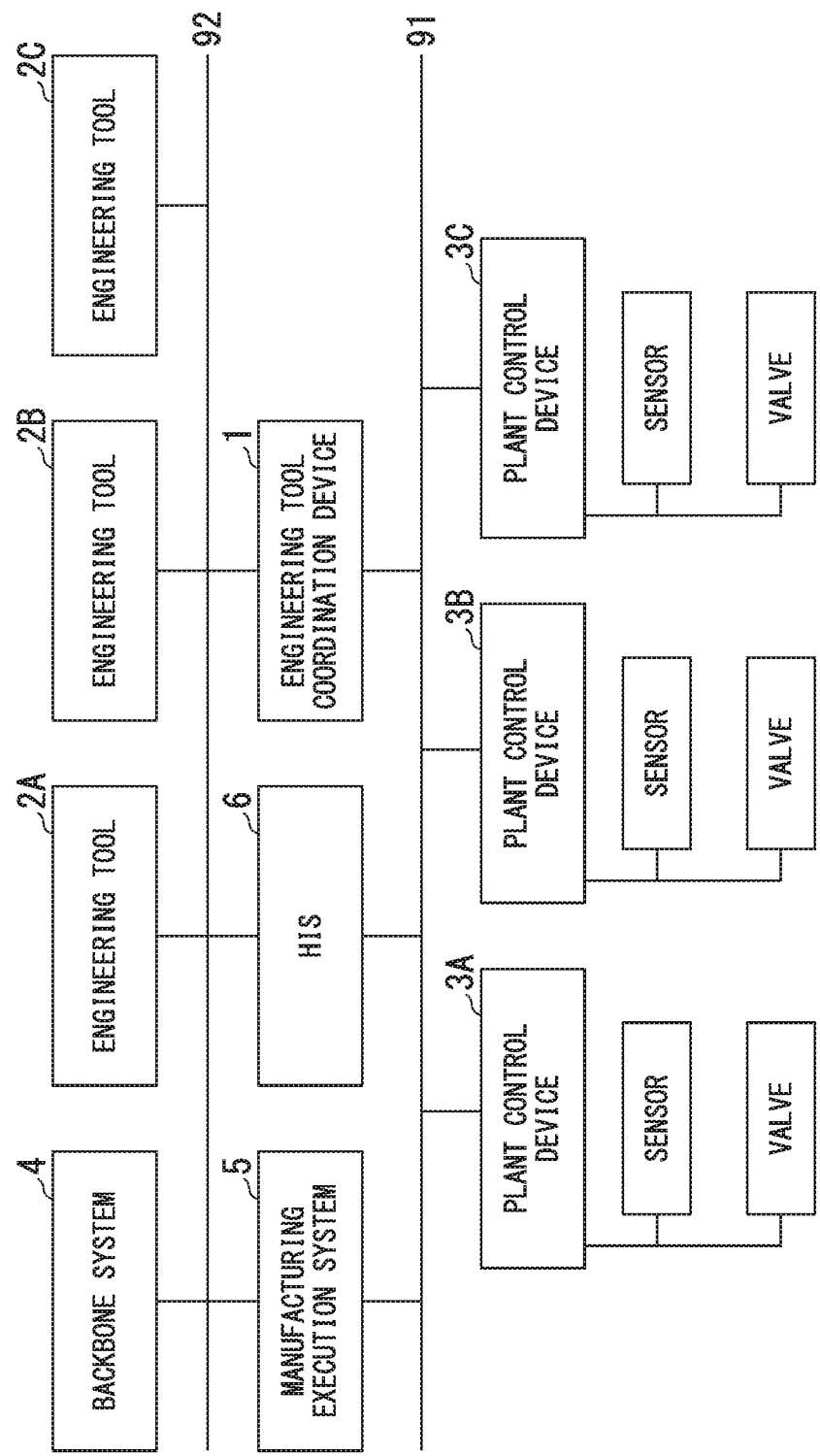
FIG. 1 is a diagram illustrating an example of a constitution of a plant using an engineering tool coordination device according to an embodiment.

First, an overview of a plant using an engineering tool coordination device will be described using FIG. 1. FIG. 1 is a diagram illustrating an example of a constitution of a plant using an engineering tool coordination device according to an embodiment. In FIG. 1, a plant 100 includes an engineering tool coordination device 1, an engineering tool 2 (2A to 2C), a plant control device 3 (3A to 3C), a backbone system 4, a manufacturing execution system 5, and a human interface station (HIS: an operation monitoring station) 6.

The engineering tool coordination device 1, the plant control device 3 (3A to 3C), the manufacturing execution system 5, and the HIS 6 are connected to each other through a first communication path 91. The first communication path 91 is, for example, a control network and is constituted of a network suitable for a process control system which has a general communication function and enables highly reliable, real time, and stable communication. Examples of the control network include Vnet/IP (registered trademark) according to CPF-10 of a real time Ethernet (registered trademark) (RTE) communication profile in which an internet protocol (IP) is used for general-purpose communication and which is defined by IEC 61784-2. The first communication path 91 may perform wired communication or wireless communication.

Also, the engineering tool coordination device 1, the engineering tool 2 (2A to 2C), the backbone system 4, the manufacturing execution system 5, and the HIS 6 are connected to each other through a second communication path 92. The second communication path 92 may perform, for example, network communication control corresponding to a general-purpose communication standard.

Note that connection between devices such as the engineering tool coordination device 1 using the first communication path 91 and the second communication path 92 illustrated in FIG. 1 is an example of a connection method, in which for example, all of the devices may be connected to the same communication path and the devices may be connected to each other by further dividing the communication path.

The plant control device 3 (3A to 3C) is a control device, such as a field control station and the like serving as a control controller of a distributed control system (DCS), a controller, a factory automation (FA) computer, and a programmable logic controller (PLC), which is configured to control the plant (not shown). The plant control device 3 executes a control program configured to control the plant. Furthermore, the plant control device 3 may be a safety control controller of a safety instrument system (SIS) configured to secure safety of a plant operation.

FIG. 1 illustrates the plant control device 3 which is connected to an input device such as a sensor and an output device such as a valve which are installed in a plant. The sensor inputs physical quantities such as a temperature, a humidity, a pressure, and a pH indicating operation states of the plant to the plant control device 3 as measurement values. The valve controls a flow rate of a liquid or a gas in the plant in accordance with output data which is output from the plant control device 3. The control program executed by the plant control device 3 processes input data acquired from an input device such as a sensor and controls an output device such as a valve. Note that, although a sensor is exemplified as an input device and a valve is exemplified as an output device in FIG. 1, an input device and an output device of the present invention are not limited thereto. For example, an input device may be an operation device such as a switch, and an output device may be an actuator such as a motor. In the embodiment, an input device and an output device are referred to as "a field device" in some cases.

FIG. 1 illustrates a case in which the plant 100 includes three plant control devices 3, i.e., the plant control device 3A, the plant control device 3B, and the plant control device 3C. It is assumed that the plant control device 3A to the plant control device 3C execute control programs having control logics which are individually installed. Here, a control logic refers to a representation of a program, software, and a software application configured to perform logical control, proportional integral derivation (PID) control, and the like used to perform a control operation for the purpose of operation control or safety control of the plant in accordance with occurrence of incidents (events). Examples of the control logic include a representation of programs in program languages such as a graphic language such as a ladder diagram (LD), a function block diagram (FBD), or a sequential function chart (SFC) and a text language such as an instruction list (IL) or a structured text (ST). Furthermore, the representation of the programs may include a data format such as extensible markup language (XML) used in each program.

The engineering tool 2 has a function of engineering a control program which operates in the plant control device 3A to the plant control device 3C via the engineering tool coordination device 1. The engineering of the control program is an operation of an engineering tool of designing, creating, constructing, modifying, deleting, or installing (downloading) a part or all of the control program, setting parameters used in the control program, managing a change history of the control program, or performing an operation test (a connection test) and the like of the control program. The engineering of the control program may include tasks for implementing the above-described operations.

For example, the engineering tool 2 may simulate an input of measurement data of the sensor and debug the control program. Furthermore, the engineering tool 2 may collect measurement data and the like of the sensor in synchronization with execution of the control program, analyze the collected measurement data, and display and output the analyzed measurement data using a graph and the like. The engineering tool 2 may convert measurement data which is displayed and output to, for example, a numerical value, such as 0 to 100%, which is normalized from an industrial quantity, such as 4 to 20 mA, which is output from a sensor. Furthermore, the engineering tool 2 may check a loop of an input and output (I/O) module of the plant control device 3 and confirm an operation thereof.

Also, the engineering tool 2 may change the control program in accordance with a change in device constitution of the plant 100. The engineering tool 2 may create a document in which control information of the plant 100 is laid out in a predetermined format.

FIG. 1 illustrates a case in which the plant 100 includes three engineering tools 2, i.e., the engineering tool 2A, the engineering tool 2B, and the engineering tool 2C. It is assumed that the engineering tool 2A to the engineering tool 2C engineer control programs in data formats and control logics which are different from each other.

Note that, in the embodiment, the engineering tool 2 may be either a program (software) having a function of engineering a control program or a device configured to execute the program. Therefore, the engineering tool 2A to the engineering tool 2C may be realized by, for example, each of programs which is executed in one device as long as the engineering tool 2A to the engineering tool 2C have a function of engineering the control program. Furthermore, each of the engineering tool 2A to the engineering tool 2C may be realized in a system constituted of a plurality of devices.

The engineering tool coordination device 1 assimilates differences between data formats and control logics of the engineering tools 2A to 2C and coordinates the engineering tool 2A to 2C and the plant control device 3 so that the engineering tools 2A to 2C enable engineering of the control program of the plant control device 3. Details of the engineering tool coordination device 1 will be described below. Note that a case in which the engineering tool coordination device 1 according to the embodiment is an engineering tool has a function of engineering the control program of the plant control device 3 even when the engineering tool 2 is not used is exemplified.

The backbone system 4 is, for example, an enterprise resource planning (ERP: management resource integration) system for process manufacturers configured to manage management resources such as an accounting process, production management, sales management, and logistics. The backbone system 4 uses, for example, information on an operation state of the plant as management information of management resources. The backbone system 4 is, for example, a general-purpose computer such as a server device and a desktop type personal computer (PC).

The manufacturing execution system 5 is, for example, a manufacturing execution system (MES) located between the backbone system 4 and the plant control device 3. The manufacturing execution system 5 monitors or manages an operation state of the plant, a working situation of workers, and the like acquired by the plant control device 3. The manufacturing execution system 5 may include an engineering management system and the like configured to manage engineering and repair work information of the plant.

The engineering management system may manage history management of a control program engineered by the engineering tool. The manufacturing execution system 5 is, for example, a general-purpose computer such as a server device and a desktop type (PC).

The HIS 6 is a device by which an operator performs an operation of the plant 100 and monitors an operation state of the plant 100. The HIS 6 includes an input device such as a switch, a keyboard, or a mouse configured to perform an operation of the plant 100. Furthermore, the HIS 6 includes a display device such as a display and a lamp configured to display the operation state of the plant 100. The HIS 6 may display a plurality of windows on one or more displays to display the operation state of the plant 100. The HIS 6 may display a predetermined message or output an alarm sound when the operation state of the plant 100 reaches a preset state. Note that the HIS 6 may be realized as a function of the manufacturing execution system 5.

Figure 2:
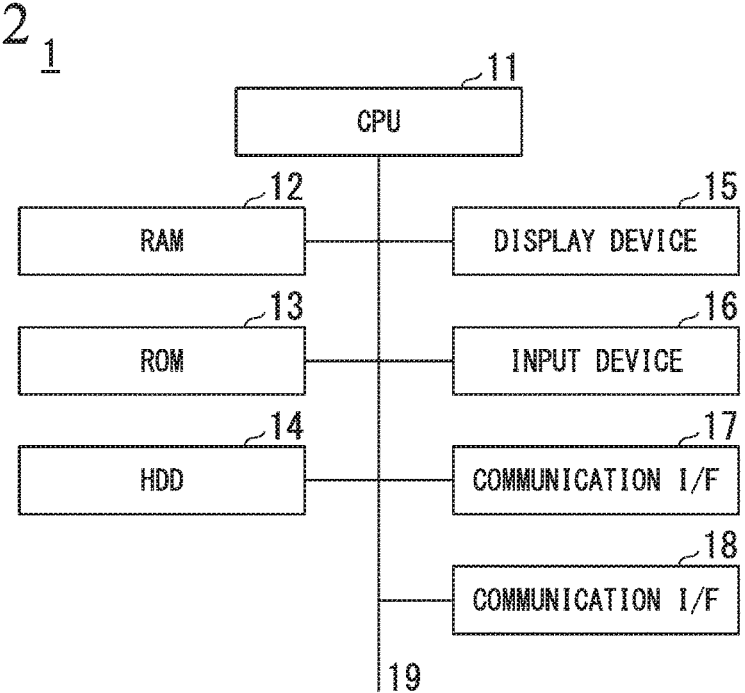
FIG. 2 is a block diagram illustrating an example of a hardware constitution of the engineering tool coordination device according to the embodiment.

Next, a hardware constitution of the engineering tool coordination device 1 will be described using FIG. 2. FIG. 2 is a block diagram illustrating an example of a hardware constitution of the engineering tool coordination device 1 according to the embodiment.

In FIG. 2, the engineering tool coordination device 1 includes a central processing unit (CPU) 11, a random access memory (RAM) 12, a read only memory (ROM) 13, a hard disk drive (HDD) 14, a display device 15, an input device 16, a communication interface (I/F) 17, a communication I/F 18, and a bus 19 configured to connect these. The engineering tool coordination device 1 can be realized by, for example, a server device, a general-purpose computer such as a desktop type PC, a device such as an FA computer and a PLC, a notebook type or tablet type computer, and the like.

The CPU 11 executes engineering tool coordination programs stored in the RAM 12, the ROM 13, or the HDD 14 to perform control of the engineering tool coordination device 1. The engineering tool coordination program is acquired from, for example, a non-transitory computer readable storage medium on which an engineering tool coordination program is recorded, or a server configured to provide an engineering tool coordination program over a network, is installed in the HDD 14, and is stored in the RAM 12 to be able to be read by the CPU 11.

The display device 15 is, for example, a liquid crystal display having a display function. The display device 15 may be realized in various forms such as a head mount type display, a glasses type display, and a watch type display. Examples of the input device 16 include a keyboard, a mouse, or the like having an input function. The input device 16 may include a microphone configured to input sound information, a camera configured to input image information, and the like. Note that the display device 15 and the input device 16 may be realized by a device having a display function and an input function such as a touch panel.

The communication I/F 17 performs communication via the first communication path 91 shown in FIG. 1 over wired communication or wireless communication. The communication I/F 18 performs communication via the second communication path 92 shown in FIG. 1 over wired communication or wireless communication. Communication standards of the first communication path 91 and the second communication path 92 are arbitrary. The communication I/F 17 performs, for example, communication control corresponding to a communication standard such as Vnet/IP (registered trademark) according to CPF-10 of a real time Ethernet (RTE) communication profile in which an IP is used for general-purpose communication and which is defined by IEC 61784-2. Furthermore, the communication I/F 17 may perform communication control corresponding to a communication standard dedicated to an industrial instrument such as International Society of Automation (ISA) 100, a highway addressable remote transducer (HART), BRAIN, FOUNDATION Fieldbus, and PROFIBUS. The communication I/F 17 may perform communication control corresponding to a general-purpose communication standard such as wireless local area network (LAN) communication, wired LAN communication, infrared communication, and short-range wireless communication.

Figure 3:
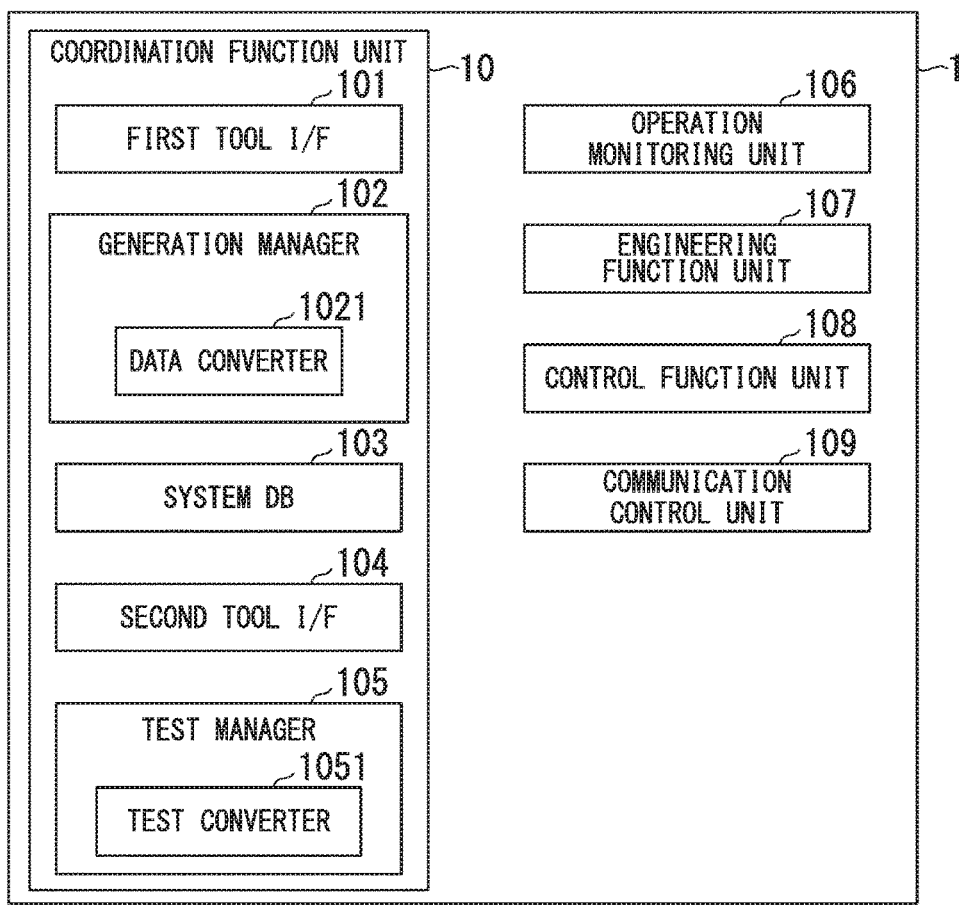
FIG. 3 is a block diagram illustrating an example of a software constitution of the engineering tool coordination device according to the embodiment.

Next, a software constitution of the engineering tool coordination device 1 will be described using FIG. 3. FIG. 3 is a block diagram illustrating an example of a software constitution of the engineering tool coordination device 1 according to the embodiment.

In FIG. 3, the engineering tool coordination device 1 has functions of a coordination function unit 10, an operation monitoring unit 106, an engineering function unit 107, a control function unit 108, and a communication control unit 109. The coordination function unit 10 has functions of a first tool I/F 101, a generation manager 102, a system database (DB) 103, a second tool I/F 104, and a test manager 105. The generation manager 102 has a function of a data converter 1021. The above-described functions of the engineering tool coordination device 1 are functional modules which are realized by an engineering tool coordination program (software) configured to control the engineering tool coordination device 1. The engineering tool coordination program may be provided from a server configured to provide a program or may be provided from a non-transitory computer readable storage medium.

The coordination function unit 10 coordinates the engineering tool 2 and the plant control device 3 which are described with reference to FIG. 1 to enable engineering of a control program of the plant control device 3 from the engineering tool 2.

The first tool I/F 101 acquires first data which is used in the engineering tool 2 configured to engineer the control program executed by the plant control device 3 configured to control the plant. The first data is engineering data with a data format which is used in a control logic in the engineering tool 2. Examples of the engineering data include a data format of I/O data which is used in the control program. The data format of the engineering data may be defined in the engineering tool. For this reason, the data format of the engineering data defined by the engineering tool 2 needs to match the data format of the engineering data defined by the plant control device 3. The first tool I/F 101 acquires the first data from the engineering tool 2 to acquire a data format defined by the engineering tool 2.

Note that the first data acquired by the first tool I/F 101 from the engineering tool 2 may be data of a format which is converted into a format of an FBD or Structured Text and conforms to an extensible markup language (XML) schema of PLCOpen (registered trademark).

For example, the first tool I/F 101 transmits information on an I/O module of the plant control device 3 and information on a data format which is able to be used in the I/O module to the engineering tool 2. The engineering tool 2 can import this I/O information transmitted from the first tool I/F 101 to create, for example, application data such as a cause & effect (C & E) matrix. The first tool I/F 101 acquires the application data created in the engineering tool 2 as the first data. The first tool I/F 101 transmits the acquired first data to the generation manager 102.

The generation manager 102 acquires the first data from the first tool I/F 101. The data converter 1021 of the generation manager 102 converts the acquired first data into second data. The second data is data having a data format which is able to be used in the control program executed by the plant control device 3. The data converter 1021 can convert the first data into the second data to match data formats. The generation manager 102 stores the converted second data in the system DB 103.

The system DB 103 provides the converted second data to the control program. The second data can be provided to the control program, for example, by downloading the second data stored in the system DB 103 to the plant control device 3.

Note that the system DB 103 may be provided to, for example, a data server outside the engineering tool coordination device 1. The second data is stored in the system DB 103 so that a conversion process from the first data to the second data and a transmission process of the second data to the plant control device 3 can be made asynchronous. Therefore, for example, when the second data is stored in the system DB 103 and control of the plant by the plant control device 3 is stopped while the plant control device 3 controls the plant (for example, an engineering tool coordination device goes offline with respect to a field device), the second data may be transmitted.

The generation manager 102 can operate the control program by applying the second data to the control program. For example, the generation manager 102 may embed the second data in source code of the control program and compile the source code to generate (build) an execution file of the control program. The generation manager 102 may compile a plurality of files to generate an execution file. The generation manager 102 stores the built execution file in the system DB 103. The plant control device 3 can execute the control program by downloading the execution file stored in the system DB 103.

The second tool I/F 104 acquires a test request (or a signal including a test request) from the engineering tool 2. The second tool I/F 104 may be an application programming interface (API) configured to provide information on the instruction which is able to be used in the control program to the engineering tool 2. The test request (first test request) acquired by the second tool I/F 104 has a first test request format. The second tool I/F 104 transmits the test request acquired from the engineering tool 2 to the test manager 105.

The engineering tool 2 can execute an operation test used to test an operation of the control program by a control logic. A type and a format of instructions used for the operation test differ in accordance with the engineering tool 2 and the control program in some cases. The test manager 105 converts the test request acquired from the engineering tool 2 into an instruction which is able to be used in the control program. The test manager 105 includes a test converter 1051. The test converter 1051 converts the test request (first test request) acquired by the second tool I/F 104 into a test request (second test request) having a second test request format executable by the control program of the plant control device 3. The second test request format is different from the first test request. The second tool I/F 104 may convert the test request instead of the test converter 1051.

The test manager 105 make the control program execute an operation test in which the second data is used on a basis of the acquired test request. At this time, since a type and a format of instructions used for a control logic of the operation test in the engineering tool 2 and a type and a format of instructions used for a control logic in the control program differ, the test manager 105 converts the control logic of the operation test in the engineering tool 2 into the control logic in the control program to execute the operation test. The test manager 105 acquires, from the control program, a result of the operation test, which has a first test result format. The test converter 1051 of the test manager 105 converts the first test result format into a second test result format usable to the engineering tool 2. The second test result format is different from the first test result format. Thereafter, the test manager 105 transmits the result of the operation test to the engineering tool 2 via the second tool I/F 104. Thus, the engineering tool 2 can execute the operation test without being aware of the control logic in the control program.

The operation monitoring unit 106 monitors an operation of the operator. For example, the operation monitoring unit 106 records the operation of the operator in the HIS 6 of FIG. 1 and collects an operation record when an abnormality occurs in the plant 100. Note that a function of the operation monitoring unit 106 may be realized in the HIS 6.

The engineering function unit 107 engineers the control program. The engineering of the control program executed in the engineering function unit 107 is similar to that of the engineering tool 2. In other words, a case in which the engineering tool coordination device 1 itself in FIG. 3 has a function of the engineering tool and can be coordinated with another engineering tool 2 may be illustrated. The engineering tool can improve workability of engineering using a tool which is shared by a control program of another plant engineered by the worker who engineers the control program. On the other hand, a plant control device configured to control the plant, a safety control device, or a controller configured to control these may differ depending on whether for an entire area or a part of a plant in some cases. The engineering tool coordination device 1 can engineer the control program executed in the plant control device 3 and provide an environment in which the engineering tool coordination device 1 can perform engineering of the control program on the engineering tool 2 serving as another engineering tool to improve work efficiency of the engineering of the control program using the engineering tool 2.

The control function unit 108 manages the operation test of the control program engineered in the engineering function unit 107. The control function unit 108 may receive the instruction of the operation test from the engineering function unit 107, execute the operation test, and output the test result to the engineering function unit 107. Since the engineering tool coordination device 1 enables the engineering of the control program in the engineering function unit 107 and the engineering of the control program in the engineering tool 2, series of operations associated with both engineerings need not interfere with each other. For example, the control function unit 108 may exclusively execute the series of operations associated with the engineering executed by the engineering function unit 107 and the series of operations associated with the engineering executed by the engineering tool 2. For example, when the operation test using the engineering function unit 107 and the operation test using the engineering tool 2 are for the same test object, the operation tests are exclusively implemented so that simultaneous updating of test objects is prevented and thus safety of the operation test and reliability of the test results can be improved. Furthermore, when the engineering function unit 107 communicates with the plant control device 3 to perform the series of operations associated with the engineering, a virtual control logic of the plant control device 3 may be provided to the engineering tool 2 so that the series of operations associated with the engineering with respect to the plant control device 3 do not interfere with each other. Note that the control function unit 108 may be a function of the engineering function unit 107.

The communication control unit 109 controls operations of the communication I/F 17 and the communication I/F 18 of FIG. 2. The communication control unit 109 includes, for example, a control program according to a communication protocol used in the communication I/F 17 and the communication I/F 18 and controls communication via the first communication path 91 and the second communication path 92 of FIG. 1.

Note that a case in which functions of the coordination function unit 10, the first tool I/F 101, the generation manager 102, the data converter 1021, the system DB 103, the second tool I/F 104, the test manager 105, the operation monitoring unit 106, the engineering function unit 107, the control function unit 108, and the communication control unit 109 of the engineering tool coordination device 1 in FIG. 3 are realized by software has been described. However, at least one of the above-described functions may be realized by hardware. Furthermore, the above-described functions may be implemented by dividing one function into a plurality of functions. The above-described functions may be implemented by integrating two or more functions into one function. For example, the function of the data converter 1021 configured to convert the first data into the second data, the function of the second tool I/F 104 configured to acquire the test request from the engineering tool, and the function of the test manager 105 configured to acquire the test request from the engineering tool may be implemented by one function unit.

First Embodiment

Figure 4:
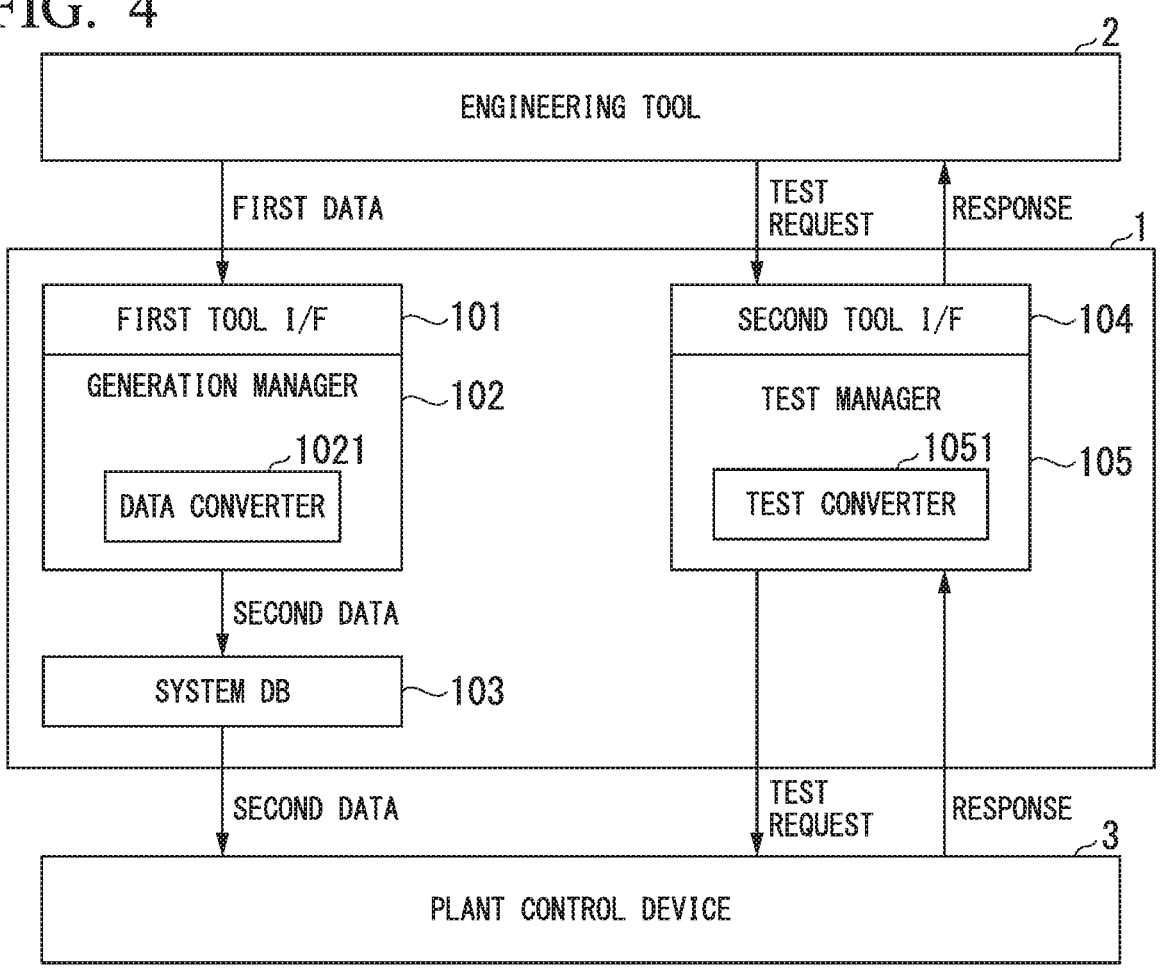
FIG. 4 is a diagram illustrating an example of a coordination function of an engineering tool coordination device according to a first embodiment.

Next, a coordination function of an engineering tool coordination device 1 according to a first embodiment will be described using FIG. 4. FIG. 4 is a diagram illustrating an example of a coordination function of the engineering tool coordination device 1 according to the first embodiment. Functions illustrated in FIG. 4 are obtained by extracting the functions of the engineering tool coordination device 1 described with reference to FIG. 3.

In FIG. 4, the engineering tool coordination device 1 includes a first tool I/F 101, a generation manager 102, a data converter 1021, a system DB 103, a second tool I/F 104, and a test manager 105.

The first tool I/F 101 includes an I/F corresponding to an engineering tool 2 and acquires first data from the engineering tool 2. The data converter 1021 of the generation manager 102 converts the first data acquired in the first tool I/F 101 into second data and stores the converted second data in the system DB 103. The system DB 103 provides the stored second data to a plant control device 3. With the above-described operation, the engineering tool coordination device 1 can transmit the first data to the engineering tool coordination device 1 without being aware of a data format used in the control program executed on the plant control device 3 with respect to the engineering tool 2 and engineer a control program of the plant control device 3.

The second tool I/F 104 acquires a test request from the engineering tool 2. At this time, since a type and a format of instructions used as a test request in the engineering tool 2 and a type and a format of instructions as a test request transmitted to the plant control device 3 differ, the second tool I/F 104 can convert the test request acquired from the engineering tool 2 into the test request transmitted to the plant control device 3 to assimilate differences between the types and the formats. A test manager transmits a test request to the plant control device 3 and acquires a response from the plant control device 3. The second tool I/F 104 converts a response acquired in the test manager into a format according to the engineering tool 2 and transmits the format to the engineering tool 2. With the above-described operation, the engineering tool coordination device 1 enables execution of an operation test of the control program of the plant control device 3 without being aware of a data format of a test request executed on the plant control device 3 with respect to the engineering tool 2.

Figure 5:
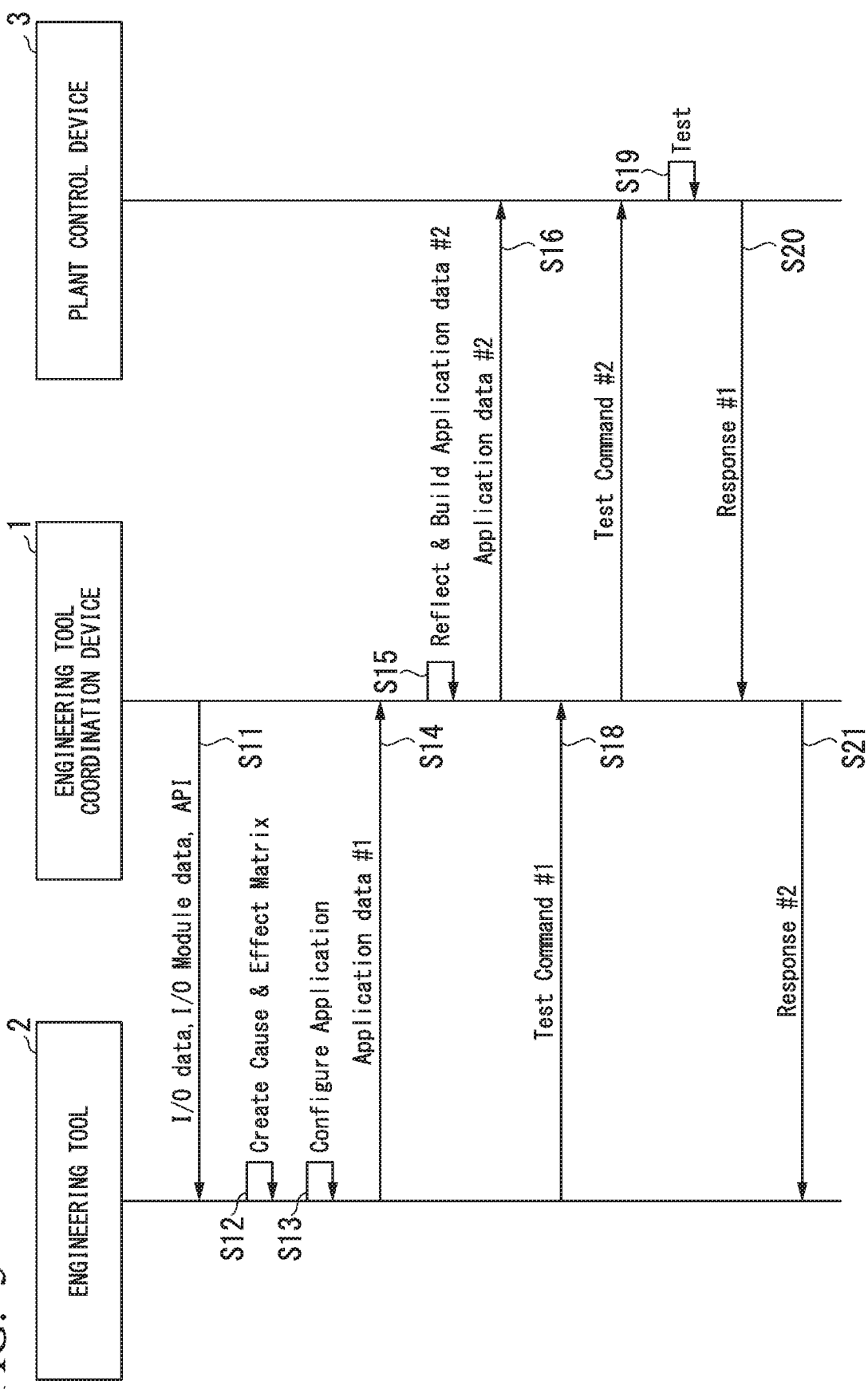
FIG. 5 is a sequence diagram for describing an example of an operation of the engineering tool coordination device according to the embodiment.

Next, an operation of the engineering tool coordination device 1 will be described using FIG. 5. FIG. 5 is a sequence diagram for describing an example of the operation of the engineering tool coordination device 1 according to the embodiment.

In FIG. 5, the engineering tool coordination device 1 transmits I/O data of the plant control device 3, data of an I/O module, and data of an API of the second tool I/F 104 of the engineering tool coordination device 1 to the engineering tool 2 (Step S11). The I/O data of the plant control device 3 and the data of the I/O module are information associated with an input and output of a field device connected to an input unit and an output unit of the plant control device 3.

Examples of the plant control device 3 include an input module which is able to receive an input in an analog manner, an input module which is able to receive an input in a digital manner, an output module which is able to output in an analog manner, or an output module which is able to output in a digital manner as types of I/O module. In the case of the plant control device 3, the field device is connected to the I/O module in accordance with types of the I/Os. The I/O data of the plant control device 3 and the data of the I/O module include information on an I/O address and the type of the I/O module of the plant control device 3 to which the field device is connected.

Also, the data of the API of the second tool I/F 104 includes information on the API of the second tool I/F 104 which is published with respect to the engineering tool. The information on the API includes, for example, a definition of a command used to request an operation test such as a loop test.

In the engineering tool 2, a C & E matrix is generated on the basis of acquired I/O data and data of the I/O module (Step S12). The C & E matrix is obtained by defining a cause-and-effect relationship of an input and output used in required specifications or the like in a tabular form (a matrix) and can identify factors having a large influence on a result. For example, input data serving as a cause (a factor) may be defined on a horizontal axis of a matrix and an effect (a result) may be defined on a vertical axis of the matrix. In addition, operation conditions (a logical operation, a delay, an interlock, and the like) are defined at intersections of inputs and outputs so that a factor having a large influence on a result can be identified. The engineering tool can ascertain correspondence between input data from the sensors and the like of the plant and an abnormality of the plant. An abnormal factor of the plant and measures can be easily ascertained by displaying the defined C & E matrix on, for example, a display device and monitoring changes in the matrix.

Subsequently, the engineering tool 2 generates a control program on the basis of the acquired API or generates a test program used to test an operation of the control program (Step S13). A command and a function, which are able to be used in the control program, are defined in the API, and the engineering tool 2 can construct a control logic (an application) on the basis of the definitions.

Subsequently, the engineering tool coordination device 1 acquires first data serving as application data from the engineering tool 2 (Step S14). The engineering tool coordination device 1 converts the acquired first data into second data and generates the second data (Step S15). The plant control device 3 acquires the converted second data from the engineering tool coordination device 1 and makes the second data executable (Step S16).

Subsequently, the engineering tool 2 transmits a test command #1 used to request an operation test to the engineering tool coordination device 1 (Step S17). The engineering tool coordination device 1 converts the transmitted test command into a test command #2 which is executable by the plant control device 3 and transmits the test command #2 to the plant control device 3 (Step S18).

The plant control device 3 having the acquired test command #2 executes the operation test (Step S19). Note that the operation test may be executed when acquiring a plurality of test commands. The plant control device 3 transmits an execution result #1 of the operation test to the engineering tool coordination device 1 (Step S20). The engineering tool coordination device 1 converts the execution result #1 of the operation test acquired from the plant control device 3 into an execution result #2 of the operation test which is executable by the engineering tool 2 and transmits the execution result #2 to the engineering tool 2 (Step S21). The engineering tool 2 having the acquired execution result #2 of the operation test may record or display, for example, an execution result.

Second Embodiment

Figure 6:
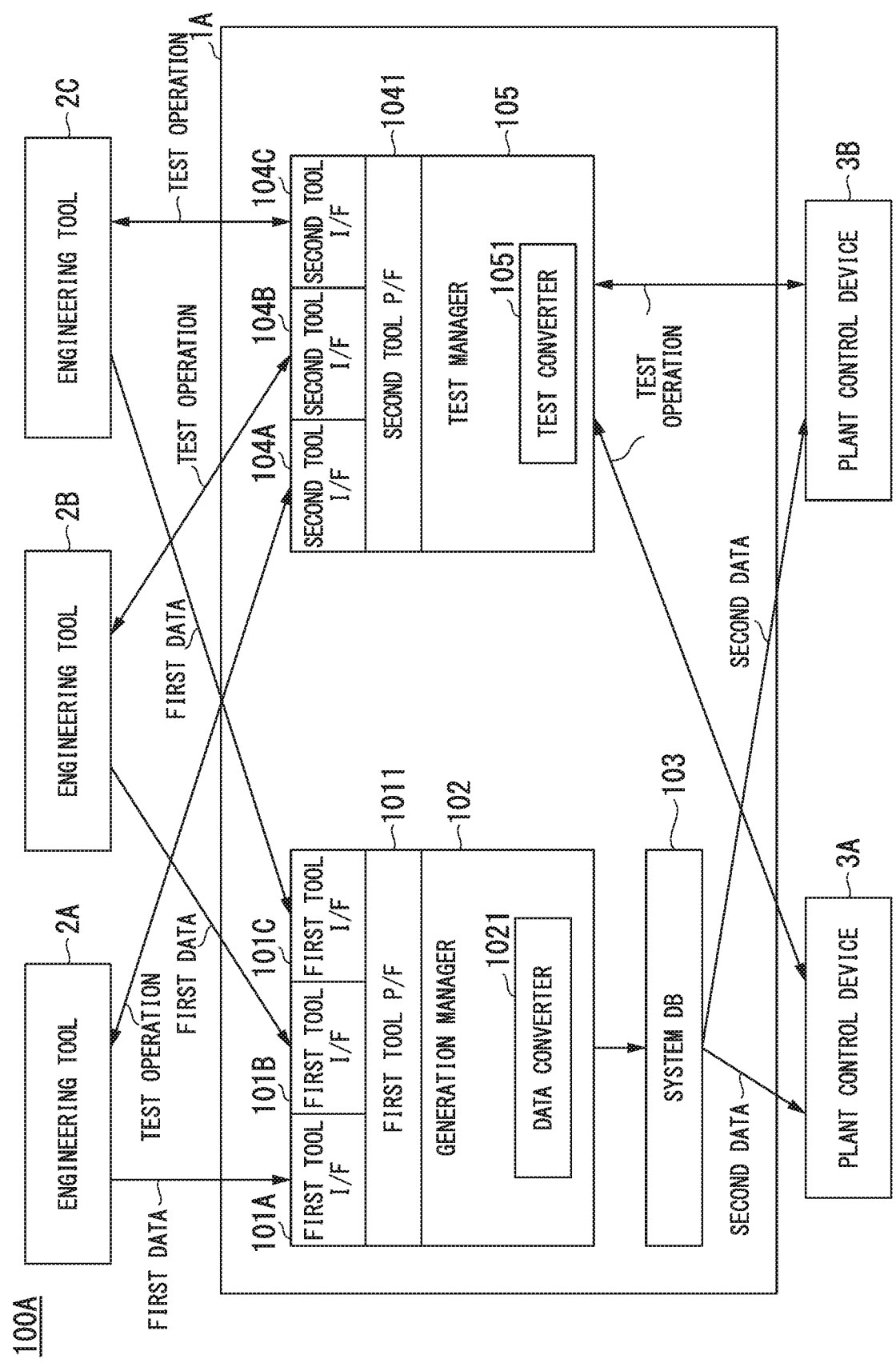
FIG. 6 is a diagram illustrating an example of a coordination function of an engineering tool coordination device according to a second embodiment.

Next, a coordination function of an engineering tool coordination device 1 according to a second embodiment will be described using FIG. 6. FIG. 6 is a diagram illustrating an example of the coordination function of the engineering tool coordination device 1 according to the second embodiment. Note that functions of constituent elements of FIG. 6 which are the same as those of FIG. 4 will be denoted with the same reference numerals and a description thereof will be omitted.

In FIG. 6, a plant 100A includes an engineering tool coordination device 1A, an engineering tool 2A, an engineering tool 2B, an engineering tool 2C, a plant control device 3A, and a plant control device 3B. Here, the engineering tool 2A, the engineering tool 2B, and the engineering tool 2C are set to be engineering tools of different types using different data formats.

The engineering tool coordination device 1A includes a first tool I/F 101A, a first tool I/F 101B, a first tool I/F 101C, a first tool PF (a platform) 1011, an generation manager 102, a data converter 1021, a system DB 103, a second tool I/F 104A, a second tool I/F 104B, a second tool I/F 104C, a second tool PF 1041, and a test manager 105.

The first tool I/F 101A includes an I/F corresponding to the engineering tool 2A and acquires first data from the engineering tool 2A. The first tool I/F 101A can convert a data format of the first data used by the engineering tool 2A into second data.

The first tool I/F 101B includes an I/F corresponding to the engineering tool 2B and acquires first data from the engineering tool 2B. The first tool I/F 101B can convert a data format of the first data used by the engineering tool 2B into second data.

Also, the first tool I/F 101C includes an I/F corresponding to the engineering tool 2C and acquires first data from the engineering tool 2C. The first tool I/F 101C can convert a data format of the first data used by the engineering tool 2C into second data. In other words, the engineering tool coordination device 1A according to the second embodiment includes a first tool I/F corresponding to a different type of engineering tool 2.

The first tool PF 1011 is an application platform which replaces the first tool I/F 101A to the first tool I/F 101C corresponding to an engineering tool 2A to an engineering tool 2C as plug-ins and makes the first tool I/F 101A to the first tool I/F 101C operable. The first tool I/F 101A to the first tool I/F 101C have a common I/F with respect to the first tool PF 1011 and have different I/Fs with respect to the engineering tool 2A to the engineering tool 2C. When an engineering tool to be used is changed, added, or removed, the first tool I/F 101 can be accordingly replaced in the first tool PF 1011. For example, when a new engineering tool 2D (not shown) is used, a tool I/F corresponding to the engineering tool 2D can be added to the first tool PF 1011 as a plug-in.

Note that the first tool I/F 101A to the first tool I/F 101C may contain a table which records correspondence relation between the engineering tool 2A to the engineering tool 2C and the first tool I/F 101A to the first tool I/F 101C and receive data from the corresponding engineering tool 2A to the engineering tool 2C on the basis of the table. In this case, the first tool I/F 101A to the first tool I/F 101C may identify the engineering tool 2A to the engineering tool 2C by identification information such as IP address and MAC address.

Note that a method of replacing the first tool I/F 101 with respect to the first tool PF 1011 is arbitrary. For example, the first tool I/F 101 may be replaced by installing a static link in the first tool I/F 101 and the first tool I/F 101 may be replaced by installing a dynamic link in the first tool I/F 101. Furthermore, the first tool I/F 101 may be added while the program of the engineering tool coordination device 1A stops or the first tool I/F 101 may be added during an operation of a program of the engineering tool coordination device 1A.

The system DB 103 provides second data to the plant control device 3A and the plant control device 3B. The system DB 103 stores the second data in a place in which the second data can be downloaded from a plurality of plant control devices 3. The system DB 103 may include dedicated storage areas for the plant control device 3A and the plant control device 3B and provide the second data individually.

The second tool I/F 104A includes an I/F corresponding to the engineering tool 2A and performs a test operation associated with the test requests and the responses to the test requests described with reference to the engineering tool 2A and FIG. 4. The second tool I/F 104A assimilates differences between a test operation with the engineering tool 2A and a test operation with the plant control device 3. In other words, since a type and a format of instructions used for a test request in the engineering tool 2A and a response test operation according to the test request and a type and a format of instructions used for a test request transmitted to the plant control device 3 and a response test operation according to the test request differ, the second tool I/F 104A can convert a test request acquired from the engineering tool 2A into a test request transmitted to the plant control device 3 to assimilate the differences between the test operations.

The second tool I/F 104B includes an I/F corresponding to the engineering tool 2B and performs a test operation with the engineering tool 2B. The second tool I/F 104B assimilates differences between the test operation with the engineering tool 2B and the test operation with the plant control device 3. In other words, the second tool I/F 104B can convert a test request acquired from the engineering tool 2B into a test request transmitted to the plant control device 3 to assimilate the differences between the test operations.

Also, the second tool I/F 104C includes an I/F corresponding to the engineering tool 2C and performs a test operation with the engineering tool 2C. The second tool I/F 104C assimilate differences between the test operation with the engineering tool 2C and the test operation with the plant control device 3. The second tool I/F 104C can convert a test request acquired from the engineering tool 2C into a test request transmitted to the plant control device 3 to assimilate the differences between the test operations.

The second tool PF 1041 is an application platform which replaces the second tool I/F 104A to the second tool I/F 104C corresponding to the engineering tool 2A to the engineering tool 2C as plug-ins and makes the second tool I/F 104A to the second tool I/F 104C operable. The second tool I/F 104A to the second tool I/F 104C have a common I/F with respect to the second tool PF 1041 and have different I/Fs with respect to the engineering tool 2A to the engineering tool 2C. In the second tool PF 1041, when an engineering tool to be used is changed, added, or removed, the second tool I/F 104 can be accordingly replaced. For example, when a new engineering tool 2D (not shown) is used, a tool I/F corresponding to the engineering tool 2D can be added to the second tool PF 1041 as a plug-in.

As described above, the engineering tool coordination device according to the embodiment includes a first tool interface configured to acquire first data having a first data format usable to an engineering tool, the engineering tool being configured to engineer a control program executed in a control device configured to control an operation of a plant, a data converter configured to convert the first data acquired by the first tool interface into second data usable to the control program, the second data having a second data format different from the first data format, a program provider configured to provide the second data converted by the data converter to the control program, a second tool interface configured to acquire a first test request having a first test request format from the engineering tool, a test converter configured to convert the first test request acquired by the second tool interface into a second test request executable in the control program, the second test request having a second test request format different from the first test request, and a test manager configured to cause to execute an operation test program in the control program and to operate an operation test using the second data on a basis of the second test request acquired by the test converter. Thereby, the engineering tool coordination device according to the embodiment can improve efficiency of engineering of the control program using the engineering tool.

Note that each of the above-described engineering tool coordination devices 1 may be a device having the above-described functions and may be realized by, for example, a system which is constituted of a combination of a plurality of devices and in which devices are connected to each other to be able to communicate with one another. Furthermore, the engineering tool coordination device 1 may be realized as a part of functions of the manufacturing execution system 5 and the HIS 6 which are described with reference to FIG. 1.

Also, a case in which the above-described engineering tool coordination device 1 includes the first tool I/F 101 and the second tool I/F 104 corresponding to the engineering tools such that the engineering tool coordination device 1 converts a type, a data format, and the like of an instruction used in test requests in the engineering tool and the plant control device and instructions used for response test operations according to the test requests to assimilate differences between test operations has been described, but the engineering tool 2 may perform data format conversion. In other words, the engineering tool 2 may include a converter configured to convert first data and second data and include an I/F configured to assimilate differences between test operations. In this case, the engineering tool 2 enables an I/F corresponding to the engineering tool coordination device 1 to be replaced as a plug-in.

The above-described engineering tool coordination device 1 includes: a first tool I/F configured to acquire first data used in an engineering tool configured to engineer a control program executed by an operation control device configured to control an operation of a plant; an engineering tool coordination unit configured to convert the acquired first data into second data; and a program provider configured to provide the converted second data to the control program. In addition, the engineering tool coordination unit may acquire a test request from the engineering tool and make the control program execute an operation test in which the second data is used on a basis of the acquired test request. In other words, the engineering tool coordination unit of the engineering tool coordination device 1 may have the function of the data converter, the function of the second tool I/F, and the function of the test management unit according to the embodiment.

The engineering tool coordination unit may convert the acquired test request into a test request which is able to be executed by a control device.

An engineering tool coordination method according to the embodiment can include: a first data acquisition step of acquiring first data used in an engineering tool configured to engineer a control program executed by an operation control device configured to control an operation of a plant; a data conversion step of converting the acquired first data into second data; a program providing step of providing the converted second data to the control program; a test request acquisition step of acquiring a test request from the engineering tool; and a test management step of making the control program execute an operation test in which the second data is used on a basis of the acquired test request to improve efficiency of engineering of the control program using the engineering tool.

Note that an execution order of the above-described steps in the engineering tool coordination method according to the embodiment is not limited to the described order of the above-described steps and may be executed in any order.

A program configured to implement functions constituting the device described in the embodiment is recorded on a non-transitory computer readable storage medium and the program recorded on the non-transitory computer readable storage medium is read into a computer system and executed so that the above-described various processes of the embodiment may be performed. Note that the "computer system" mentioned herein may include an operating system (OS) and hardware such as peripheral devices. Furthermore, the "computer system" also refers to a home page providing environment (or a display environment) as long as the "computer system" uses a world wide web (WWW) system. The "non-transitory computer readable storage medium" refers to a storage device such as a non-volatile memory capable of writing such as a flexible disk, a magneto-optical disk, a ROM, and a flash memory, a portable medium such as a compact disc (CD)-ROM, and a hard disk built into a computer system.

The "non-transitory computer readable storage medium" also refers to a medium configured to hold a program for a certain period of time like a volatile memory (for example, a dynamic random access memory (DRAM)) inside a computer system serving as a server and a client when the program is transmitted over a network such as the Internet and a communication circuit such as a telephone line. Furthermore, the above-described program may be transmitted from a computer system configured to store the program in a storage device or the like to another computer system via a transmission medium or through transmission waves in the transmission medium. Here, the "transmission medium" configured to transmit a program is a medium having a function of transmitting information like a network such as the Internet (a communication network) and a communication circuit (a communication line) such as a telephone line. Furthermore, the program may be used to implement some of the above-described functions. In addition, the program may be a so-called difference file (difference program) configured to realize the above-described functions by combination with a program which is already recorded in a computer system.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An engineering tool coordination device comprising:
   a memory configured to store a program; and
   a processor configured to execute the program to implement:
   a first tool interface configured to acquire first data having a first data format usable to an engineering tool, the engineering tool being configured to engineer a control program executed in a control device configured to control an operation of a plant;
   a data converter configured to convert the first data acquired by the first tool interface into second data usable with the control program by the control device, the second data having a second data format different from the first data format; and
   a program provider configured to provide the second data converted by the data converter to the control program;
   a second tool interface configured to acquire a first test request having a first test request format from the engineering tool;
   a test converter configured to convert the first test request acquired by the second tool interface into a second test request executable with the control program by the control device, the second test request having a second test request format different from the first test request format; and
   a test manager configured to cause to execute an operation test program in the control program and to operate an operation test using the second data on a basis of the second test request acquired by the test converter and acquire an operation test result of the operation test from the control program, and transmit the operation test result to the engineering tool,
   wherein the first tool interface transmits input/output information of the control device to the engineering tool to cause the engineering tool to create the first data, and acquires the first data from the engineering tool,
   the operation test result generated by the control device has a first test result format, and
   the test converter is configured to convert the first test result format into a second test result format usable to the engineering tool, the second test result format being different from the first test result format.

2. The engineering tool coordination device according to claim 1, further comprising:
   a first tool platform configured to replace the first tool interface corresponding to the engineering tool and to make the first tool interface operable; and
   a second tool platform configured to replace the second tool interface corresponding to the engineering tool and to make the second tool interface operable.

3. The engineering tool coordination device according to claim 2, wherein
   the first tool platform is configured to replace the first tool interface corresponding to the engineering tool and to make the first tool interface operable by implementing with static link or dynamic link.

4. The engineering tool coordination device according to claim 1, further comprising:
an engineering function unit configured to engineer the control program; and
a control function unit configured to manage the operation test of the control program engineered in the engineering function unit.

5. The engineering tool coordination device according to claim 4, wherein
the control function unit is configured to make the operation test executed by the test manager and the operation test executed by the engineering function unit exclusively executable.

6. An engineering tool coordination method comprising:
acquiring first data having a first data format usable to an engineering tool, the engineering tool being configured to engineer a control program executed in a control device configured to control an operation of a plant;
converting the first data into second data usable with the control program by the control device, the second data having a second data format different from the first data format;
providing the second data to the control program;
acquiring a first test request having a first test request format from the engineering tool;
converting the first test request into a second test request executable with the control program by the control device, the second test request having a second test request format different from the first test request format;
causing to execute an operation test program in the control program and to operate an operation test using the second data on a basis of the second test request;
acquiring an operation test result of the operation test from the control program; and
transmitting the operation test result to the engineering tool,
wherein the acquiring the first data further comprises transmitting input/output information of the control device to the engineering tool to cause the engineering tool to create the first data and acquiring the first data from the engineering tool,
the operation test result generated by the control device has a first test result format, and
the engineering tool coordination method further comprises converting the first test result format into a second test result format usable to the engineering tool, the second test result format being different from the first test result format.

7. The engineering tool coordination method according to claim 6, further comprising:
replacing a first tool interface corresponding to the engineering tool to make the first tool interface operable, the first tool interface being for acquiring the first data; and
replacing a second tool interface corresponding to the engineering tool to make the second tool interface operable, the second tool interface being for acquiring the second data.

8. The engineering tool coordination method according to claim 7, wherein
replacing the first tool interface corresponding to the engineering tool to make the first tool interface operable by implementing with static link or dynamic link.

9. The engineering tool coordination method according to claim 6, further comprising:
engineering the control program; and
managing the operation test of the engineered control program.

10. The engineering tool coordination method according to claim 9, further comprising:
making the operation test of the engineered control program and the operation test executed by the engineering tool exclusively executable.

11. A non-transitory computer readable storage medium storing one or more programs configured for execution by a computer, the one or more programs comprising instructions for:
acquiring first data having a first data format usable to an engineering tool, the engineering tool being configured to engineer a control program executed in a control device configured to control an operation of a plant;
converting the first data into second data usable with the control program by the control device, the second data having a second data format different from the first data format;
providing the second data to the control program;
acquiring a first test request having a first test request format from the engineering tool;
converting the first test request into a second test request executable with the control program by the control device, the second test request having a second test request format different from the first test request format;
causing to execute an operation test program in the control program and to operate an operation test using the second data on a basis of the second test request;
acquiring an operation test result of the operation test from the control program; and
transmitting the operation test result to the engineering tool,
wherein acquiring the first data further comprises transmitting input/output information of the control device to the engineering tool to cause the engineering tool to create the first data and acquiring the first data from the engineering tool,
the operation test result generated by the control device has a first test result format, and
the one or more programs comprise instructions for converting the first test result format into a second test result format usable to the engineering tool, the second test result format being different from the first test result format.

12. The non-transitory computer readable storage medium according to claim 11, wherein the one or more programs comprise instructions for:
replacing a first tool interface corresponding to the engineering tool to make the first tool interface operable, the first tool interface being for acquiring the first data; and
replacing a second tool interface corresponding to the engineering tool to make the second tool interface operable, the second tool interface being for acquiring the second data.

13. The non-transitory computer readable storage medium according to claim 11, wherein the one or more programs comprise instructions for:
engineering the control program; and
managing the operation test of the engineered control program.

14. The non-transitory computer readable storage medium according to claim 13, wherein the one or more programs comprise instructions for:

making the operation test of the engineered control program and the operation test executed by the engineering tool exclusively executable.

\* \* \* \* \*